No. 824,508. PATENTED JUNE 26, 1906.
M. C. ROGERS.
WATER AND FEED TROUGH FOR FOWLS.
APPLICATION FILED JULY 3, 1905.
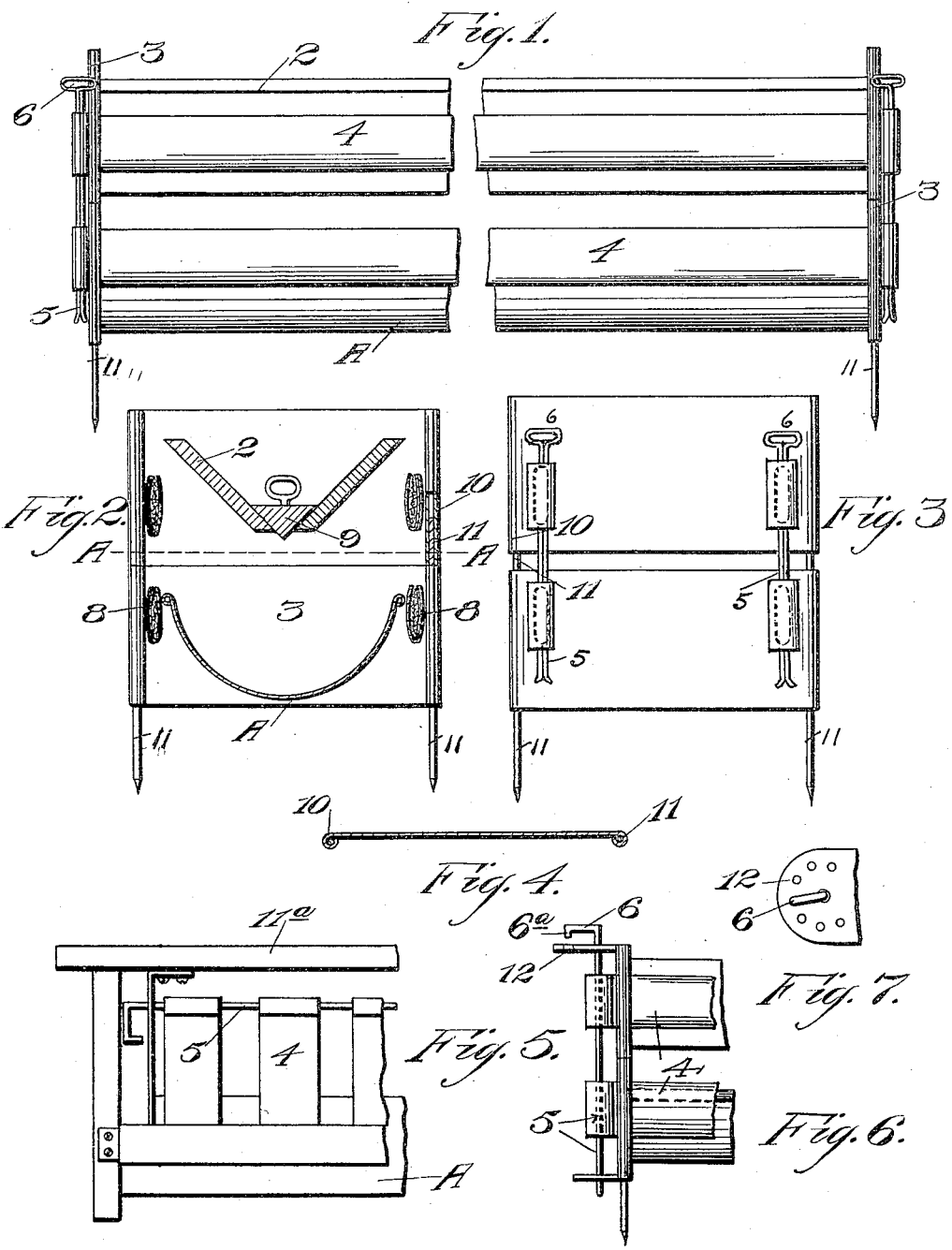
Witnesses.
Inventor:
Marshall C. Rogers
By Geo. H. Strang, Atty.

UNITED STATES PATENT OFFICE.

MARSHALL C. ROGERS, OF WOODLAND, CALIFORNIA, ASSIGNOR OF ONE HALF TO WILLIAM C. ROGERS, OF WOODLAND, CALIFORNIA.

WATER AND FEED TROUGH FOR FOWLS.

No. 824,508.      Specification of Letters Patent.      Patented June 26, 1906.

Application filed July 3, 1905. Serial No. 268,088.

*To all whom it may concern:*

Be it known that I, MARSHALL C. ROGERS, a citizen of the United States, residing at Woodland, in the county of Yolo and State of California, have invented new and useful Improvements in Water and Feed Troughs for Fowls, of which the following is a specification.

My invention relates to a device for feeding and watering fowls and means connected therewith for applying disinfectants to destroy vermin and cure diseases.

It consists in the combination of devices and in details of construction, which will be more fully explained by reference to the accompanying drawings, in which—

Figure 1 is a side elevation of my device. Fig. 2 is a transverse section. Fig. 3 is an end view. Fig. 4 is a horizontal section of an end plate with sockets and rods. Fig. 5 is a side view showing vertical disposition of the pads. Fig. 6 is a section of the winding and locking devices. Fig. 7 is a plan of the locking-plate.

It is the object of my invention to provide a sanitary and germ-destroying feed and drinking trough for fowls and animals which become more or less vermin-infested and to which remedies may be applied while they are in the act of feeding or drinking.

A represents a trough of any desired dimensions, shape, or material, adapted to contain food or drink in any suitable or desired form. Above this trough is a trough or hopper 2, through which the food or water may be conveniently supplied to the trough A. A suitable means, as the end pieces 3 and appropriate legs 11, are employed to support the hopper and trough and allow them to be raised and lowered relative to the ground. The trough and hopper A are sufficiently separated vertically to admit of pads, tubes, or other suitable form of flexible and porous material 4, which are so constructed as to admit of filling with any desired disinfectant or medicated powder. If the medicated substance is in the form of a liquid, the pads may be filled with a suitable porous absorbent which will hold a considerable quantity of the liquid in suspension. These pads or tubes are here shown in the form of folded material closed at the bottom and opened at the top, and they are stretched either horizontally or vertically so as to occupy a considerable portion vertically of the space between the trough and hopper. When arranged horizontally, either one or both ends may be coiled upon rods or rollers 5, having handles 6, by which they may be turned, and a sufficient tension being maintained by friction in passing through openings in the end pieces 3 or otherwise, so that it will take some slight pressure to separate the edges of the pads when the fowl or animal inserts its head to obtain the food or drink. This operation will thus cause a little pressure upon the neck, and the disinfectant or sanitary material will be rubbed off in small quantities and be retained upon the feathers or hair about the head and neck. It will be understood that these receptacles are of gauze, screen, or other reticulated material which will retain the substance for a considerable time, so that whenever the fowl or animal inserts its head a portion of it will be removed from the pad within or upon which it is carried.

In order to make the application particularly effective for fowls, the feed-hopper above is placed so low that the fowl cannot raise its head, as is usual, without first withdrawing it from between the pads after a mouthful of water has been taken. Thus the head will be inserted and removed a number of times during the act of drinking or feeding and a considerable quantity of the material will be deposited upon the feathers. If the containing-pads are placed vertically, the pressure will be upon the sides of the neck instead of the top and bottom; but the effect will be equally advantageous. When placed in a vertical position, any suitable bar or device may be placed above the trough to prevent the lifting of a head without withdrawing it. The hopper acts as a guard and protection for the food or water in the trough and will prevent the fowls from jumping across or into it, so that the food and water will be kept at all times measurably clean. It will be understood that in place of the containing tubes or pads vertical absorbent wicks or like devices may be employed having the ends dipped into vessels containing a solution of the substance and that the wicks will be kept moistened by capillary attraction. In the case of fowls when their feathers have become soiled by such application they usually dress the feathers and arrange them, and in so doing the substance will be more fully distributed and carried down into the feathers and against the skin. In this manner I am enabled to provide an apparatus which will greatly assist in ridding fowls or animals of vermin and prevent skin and other diseases which show about the head and neck.

If the absorbent material is disposed vertically, the interspaces will be sufficient to allow the heads to be introduced and contact maintained with the sides of the neck, the application being thus made to the sides of the neck. When white fowls are kept, it is desirable to prevent the discoloration of the exterior feathers, and the outsides of the pads may be covered with oil-cloth or equivalent non-absorbent 8. When the head is inserted, the oil-cloth will protect the exterior feathers, and when it is withdrawn the feathers will be ruffled and turned backward, and the substance to be applied will adhere to the inner surfaces of the feathers and to the skin, but will not show on the outside. The upper trough may have a cover or plug 9 fitting the inlet-passage to keep out the dirt, and the end plates may be bent or carry sockets 10, which fit over the upper ends of rods 11, which are fixed to the lower trough. The relative positions of the troughs are thus maintained, and the upper trough is easily removed and replaced. By reason of the foregoing construction no means other than the snug fit of the rods 11 in their sockets are required to maintain the necessary tension of the parts. The sleeves or sockets fit so snugly upon the rods that they will remain wherever they may be adjusted.

If the device is to be applied to old troughs, it is only necessary to fit a cover 11ª to the top of the trough, resting upon the upwardly-extended ends or other support at such a height as to prevent the head being lifted without being withdrawn, as previously described. The devices for applying the disinfecting material may then be supported and stretched upon this cover, as shown, and removable with it.

In order to secure the rods or rollers 5 and maintain the tension of the flexible carriers, the handles 6 may be of crank form having downturned outer ends 6ª, and these ends may by pushing down engage with holes 12, made in the top or cover to prevent unwinding of the material.

Having thus described my invention, what I claim, and desire to secure by Letters Patent, is—

1. The combination with a feed or drinking trough, of a supply-hopper located above the trough, closed ends between the trough and hopper, and flexible containing-holders disposed between the trough and hopper and separated to allow the fowl or animal to insert its head with a rubbing contact against the holders.

2. A device for applying sanitary and vermin-destroying substances, said device comprising a feed or drinking trough and superposed cover, flexible reticulated holders containing the substance to be applied, and means by which said holders are stretched substantially parallel between the trough and hopper and with interspaces between the holders.

3. A device for applying sanitary or vermin-destroying material to fowls and the like, said device comprising a feed or drinking trough, a superposed cover, reticulated or absorbent pads stretched substantially parallel between the trough and hopper and with interspaces between the pads, and means by which the pads may be stretched to any desired tension.

4. In a device for applying sanitary or vermin-destroying materials, a feed or drinking trough, absorbent pads with means for stretching them to form open channels between them.

5. In a device for applying sanitary or vermin-destroying materials, a feed or drinking trough, absorbent pads with means for stretching them to form open channels between, and an exterior covering of non-absorbent material.

6. In a device for applying sanitary or vermin-destroying materials, a feed or drinking trough with a protective cover, absorbent pads stretched in parallel lines with interspaces, and pins and sockets whereby the cover is removably attached to the trough.

7. In a device for applying sanitary or vermin-destroying materials, a feed or drinking trough with a protective cover, a plurality of absorbent pads with interspaces, turnable pins or rollers upon which the pads are coiled, turnable handles therefor, and locking engagements for said handles.

In testimony whereof I have hereunto set my hand in presence of two subscribing witnesses.

MARSHALL C. ROGERS.

Witnesses:
S. H. NOURSE,
HENRY P. TRICOU.